United States Patent [19]

Dembicki et al.

[11] 4,311,247

[45] Jan. 19, 1982

[54] GLASS CONTAINER AND THERMOPLASTIC CLOSURE COMBINATION

[75] Inventors: Michael T. Dembicki; William J. Poad, both of Brockport, Pa.

[73] Assignee: Brockway Glass Company, Inc., Brockway, Pa.

[21] Appl. No.: 210,175

[22] Filed: Nov. 25, 1980

Related U.S. Application Data

[62] Division of Ser. No. 86,398, Oct. 19, 1979, Pat. No. 4,260,438.

[51] Int. Cl.³ .............. B65D 51/00; B32B 17/10; B67B 3/00
[52] U.S. Cl. .................. 215/232; 53/278; 53/478; 65/111; 65/30.1; 156/69; 156/322; 156/629; 156/663; 428/35; 428/200; 428/426; 428/427; 428/432; 413/8
[58] Field of Search .............. 53/287, 329, 478; 65/30 R, 32, 33, 111; 113/1 D; 156/69, 153, 322, 629, 635, 663, 292; 215/232; 428/420, 421, 426, 427, 432, 35, 195, 200

[56] References Cited

U.S. PATENT DOCUMENTS

| | | | |
|---|---|---|---|
| 3,249,246 | 5/1966 | Mahoney | 215/1 R |
| 3,314,772 | 4/1967 | Poole et al. | 65/30 R |
| 3,460,310 | 8/1969 | Adcock et al. | 53/478 |
| 3,485,687 | 12/1969 | Chapman et al. | 156/663 X |
| 3,498,819 | 3/1970 | Lyle et al. | 65/60 X |
| 3,501,042 | 3/1970 | Risch et al. | 215/232 |
| 3,653,864 | 4/1972 | Rothermel et al. | 65/30 R |
| 3,656,922 | 4/1972 | Budd | 65/30 R |
| 3,827,871 | 8/1974 | Budd | 65/30 R X |
| 4,122,790 | 10/1978 | Rowe et al. | 113/120 R |

OTHER PUBLICATIONS

R. Muto et al., "Adhesion of Ethylene-Tetrafluoroethylene Copolymer With Silicate Glasses", J. of Non-Crystalline Solids, 19, (1975), pp. 369-376.

Primary Examiner—Robert A. Dawson
Attorney, Agent, or Firm—Christel, Bean & Linihan

[57] ABSTRACT

A glass container having an upper rim for dispensing the contents thereof and a sealing membrane adapted to be applied to said rim to seal the contents of the container. The sealing surface of the container is prepared by treatment with fluorine and a metal oxide, or a sulfur oxide and a metal oxide, or with fluorine alone or a sulfur oxide alone, at an elevated temperature. To form the closure a membrane comprising a thermoplastic film is applied over the sealing surface and heated to result in a glass/plastic adhesion. The membrane may be a thermoplastic polymer/aluminum foil laminate.

6 Claims, 1 Drawing Figure

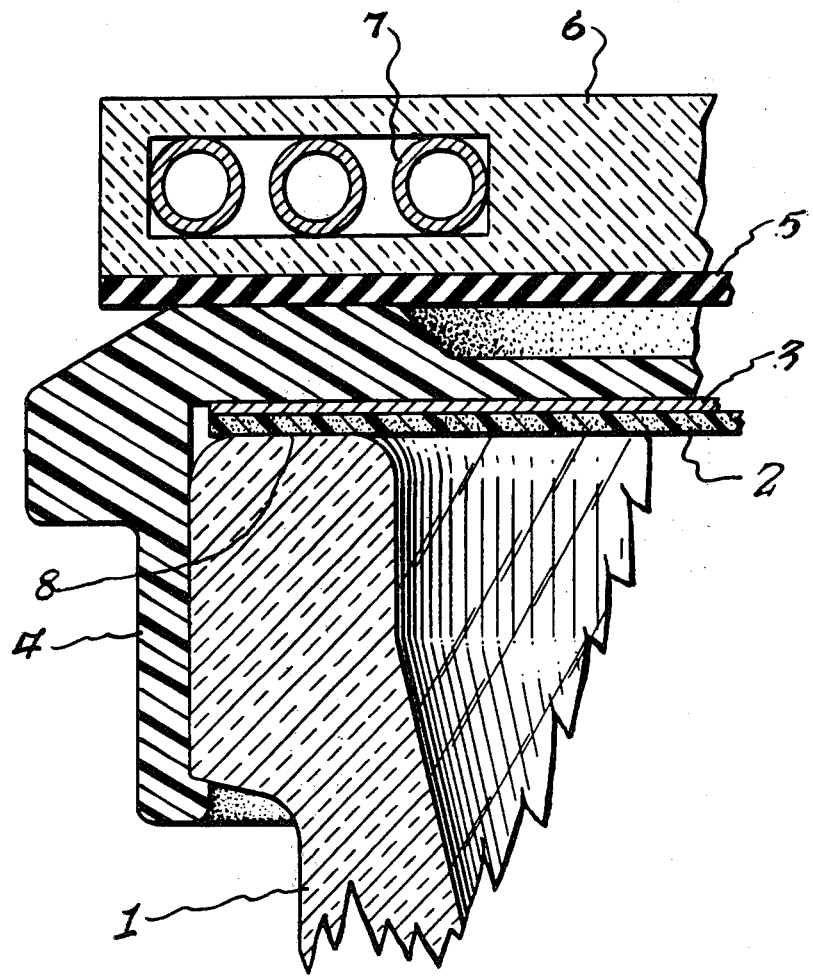

GLASS CONTAINER AND THERMOPLASTIC CLOSURE COMBINATION

This is a division of application Ser. No. 086,398 filed Oct. 19, 1979, now U.S. Pat. No. 4,260,438.

BACKGROUND OF THE INVENTION

This invention relates to the preparation of glass for thermoplastic membrane sealing. Heat activated membrane seals for plastic containers are common in the packaging and canning art. Generally a membrane, which may be a laminate of aluminum foil and a thermoplastic polymer, is pressed on the rim of a plastic container and heated to form polymer-polymer adhesive contact. The problem with this method when used with soda-lime-silica glass containers is that the failure of the seal will generally occur within five days of sealing due to poor initial adhesion between the glass and the polymer or poor durability of the adhesion.

SUMMARY OF THE INVENTION

By treating the sealing surface of a glass container with fluorine or a sulfur oxide and preferably in combination with a metal oxide the glass surface is altered to allow strong bonding with thermoplastic materials such as Surlyn, vinyl acetate, or polyethylene. The treating step is conducted at an elevated temperature at which fluorides and metal compounds decompose to yield fluorine and metal oxides, respectively. The metal oxide and fluorine or sulfur oxide treatment may take place in any order or simultaneously.

Any sulfate formed as a result of the sulfur oxide treatment is removed from the glass surface. Thereafter, the seal is formed by pressing a membrane comprising a thermoplastic film over the sealing surface and heating to form a glass/plastic adhesive bond. The membrane desirably may be an aluminum foil-thermoplastic film laminate. It may also be a polymer sheet, a laminate of polymer, a paper/polymer laminate or a laminate of one or more layers of polymers, metal foil, and paper.

It is a specific object of this invention to provide an improved method for preparing a container having a glass sealing surface to form a more durable seal by first treating the glass sealing surface employing fluorine or sulfur oxides, then with metal oxides and thereafter pressing a membrane comprising a thermoplastic film on the sealing surface and heating the region of the sealing surface to cause plastic/glass bonding.

It is a further object to supply the fluorine and metal oxide by a compound decomposable under heat.

It is a further object to employ in the method and seal a laminated membrane.

It is a further object of the invention to treat the glass sealing surface with fluorine and then hot pressing a membrane comprising a thermoplastic film thereon.

Further objects will become apparent from the following disclosure.

BRIEF DESCRIPTION OF THE FIGURE

The FIGURE is a parted view-in section of the upper portion of a glass container showing the mode of attaching a metal foil/thermoplastic film membrane to the container's sealing surface.

DESCRIPTION OF THE INVENTION

The invention comprises the preparation of a glass container for use with a seal comprising a membrane closure as an alternative to the conventional screw cap for glass containers. A membrane comprising a thermoplastic polymer is heat sealed to the sealing surface of the glass container. Heat sealing may be accomplished by pressing the membrane to the glass at a temperature near or above the softening point of the thermoplastic but below its melting point as by use of a heated platen. The membrane may be covered by a plastic snap-cap prior to or subsequent to sealing. The membrane, desirably may be metal foil/thermoplastic polymer laminate which allows induction heating of the laminate.

Without the use of the treatment described herein, a serious problem with this type of seal is its vulnerability to humidity. Various coatings have been applied to overcome this problem, commonly being metallic oxides. While the latter improves the stability of the polymer/glass bond in the presence of water vapor, it is not totally successful and failures occur, often within five days following sealing.

Treating glass surfaces with sulfur oxides or decomposable fluorine compounds and treatment with sulfur and fluorine compounds are well known. These are shown for example, in U.S. Pat. No. 3,249,246.

However, the use of these methods for improving the stability of a polymer/glass bond in the presence of water vapor, enabling the employment of a thermoplastic membrane seal for glass containers has not been shown. The further treatment of the sealing surface to supply a metal oxide coating after the fluorine or sulfur oxide treatment results in a further improvement in glass/polymer bond stability.

We have found that a tight, long-lasting seal for a glass sealing surface of a container, such as the mouth of a glass jar or bottle, normally termed the "finish", may be formed by treating the glass sealing surface and then hot pressing thereon a thermoplastic film. The treatment steps comprise heating the glass sealing surface and then impinging upon it a fluoride which decomposes at the temperature employed, or with a sulfur oxide. If a sulfur oxide, i.e., sulfur dioxide or sulfur trioxide is employed, it may be applied to the sealing surface as a gas stream. Alternatively, an aqueous solution of a compound, such as ammonium persulfate, which decomposes upon heating to form sulfur oxides may be applied to a cool sealing surface which is thereafter heated. A metal compound which is a metal oxide precursor, such as tin chloride or titanium chloride, may be applied to the hot glass surface in liquid or vapor form. Metal organic compounds of chromium, tin or titanium may be applied in liquid form to the glass surface after cooling to a temperature range of approximately 100° F. to 300° F.

After sealing surface treatment is complete and the surface has cooled, as shown in the FIGURE, a laminate of aluminum foil 3 and thermoplastic film 2 is placed on the rim of jar 1 with the thermoplastic film 2 contacting the glass rim, a plastic snap cover 4 is placed over the jar mouth as shown, to force the laminate in contact with the rim. A resilient pad 5, is placed over the snap cover and a water-cooled induction heating coil 7, in a chuck or holder 6 of insulating material is placed over pad 5. Thereafter high frequency alternating current is passed through the induction coil to heat aluminum foil 3 and cause the thermoplastic film 2 to bond to the glass rim along sealing surface 8.

A satisfactory seal can be obtained in the case of the fluoride treatment only, although including the metal oxide treatment yields better results.

The following examples set forth embodiments of the invention.

EXAMPLE 1

Six-ounce capacity round glass jars were sealed without treatment of the sealing surface. The jars were sealed with a Surlyn laminated foil using a platen heated to 350° F. at a pressure of 200 psi. Dwell time of the heated platen on each jar was 30 seconds. Thereafter, the sealed jars were tested for seal durability.

Three different tests were used for determining seal durability. The first test, designated Test No. 1, consisted of sealing jars with a small amount of water inside and thereafter placing the sealed jars in a humidity cabinet maintained at a temperature of 100° F. and a relative humidity of 85%. Test No. 2 consisted of sealing empty jars and thereafter placing them in a humidity cabinet maintained at the same conditions as Test No. 1. The third test, or Test No. 3, consisted of sealing jars containing water and thereafter allowing the jars to remain at ambient temperature and humidity. All tests were considered complete after 28 days.

Six jars sealed as previously described were subjected to each of Test Nos. 1–3. Results of the tests are set out in the following table:

TABLE I

|            | Days to Failure | % of Samples that Failed | % Still Sealed Over 21 Days |
|------------|-----------------|--------------------------|-----------------------------|
| Test No. 1 | 1               | 100%                     | 0%                          |
| Test No. 2 | 1               | 67%                      |                             |
|            | 2               | 100%                     | 0%                          |
| Test No. 3 | 1               | 67%                      | 0%                          |
|            | 2               | 100%                     | 0%                          |

EXAMPLE 2

A glass jar of conventional soda-lime-silica composition was preheated in a furnace to 800°–1200° F. and then rotated under a ribbon burner, the burner flame playing on the rim of the jar for 1 to 10 seconds. The flame consisted of natural gas—air—1,1-difluoroethane (DFE), the latter furnishing the fluorine. Thereafter, tin tetrachloride vapors were blown against the rim of the jar for a like period of time while still rotating. Thereafter, the jar was cooled and sealed as described in Example 1.

The bond was found to be impervious to 85 percent relative humidity at 100° F. and to direct water contact.

Instead of DFE, other fluorine compounds which decompose when heated (i.e., in the hot gas flame or in contact with the hot glass surface) may be employed, such as other alkyl fluorides, $NH_4F$, $NH_4HF$, metal fluorides, such as $SnF_4$, $BF_3$, $AlF_3$, etc., or metalloorganic fluorides, such as $NH_4SnF_3$, $(CH_3)_2SnF_2$, $BF_3$, $AlF_3$ etc.

EXAMPLE 3

Ten baby food jars were preheated in an oven to 500° C. Each jar was rotated under a ribbon burner for 30 seconds. The flame consisted of natural gas—air—1,1-difluoroethane, (DFE), the latter furnishing the fluorine. The flow of DFE to the burner was 1.0 scfh. After cooling, the jars were sealed with various aluminum foil/polymer laminates. The platen heater temperature was 300° F., the pressure on the jar rim was 290 psi, and the dwell time on the jar was 15 seconds. The jars were sealed with water inside and allowed to remain in ambient relative humidity as described in Test No. 3 of Example 1.

The following table gives the result of the above tests.

TABLE II

|            | Days to Failure | % of Samples that Failed | % Still Sealed Over 21 Days |
|------------|-----------------|--------------------------|-----------------------------|
| Test No. 3 | 7               | 30%                      |                             |
|            | 9               | 50%                      |                             |
|            | 12              | 60%                      |                             |
|            |                 |                          | 40%                         |

EXAMPLE 4

This example illustrates treatment with a sulfur oxide. A solution comprising 4 grams ammonium persulfate and 10 mls water was sprayed onto the rim of six-ounce round jars. The jars were then heated in an oven to 500° C. and allowed to cool. The sodium sulfate bloom formed by treatment was removed by rinsing with water. The jars were sealed as described previously in Example 2. Five jars were sealed for Test No. 1 and four jars for Test No. 3.

TABLE III

|            | Days to Failure | % of Samples that Failed | % Still Sealed Over 21 Days |
|------------|-----------------|--------------------------|-----------------------------|
| Test No. 1 | 3               | 40%                      |                             |
|            | 4               | 100%                     | 0%                          |
| Test No. 3 | 11              | 25%                      |                             |
|            | 12              | 75%                      | 25%                         |

EXAMPLE 5

Nine three-ounce tea jars of conventional soda-lime-silica composition were fluorine treated in the manner described in Example 3, except that the DFE flow was 20 scfh and time under burners was 15 seconds. While the jar was still hot, tin tetrachloride vapors were blown against the rim of the jar for approximately 5 seconds, while still rotating. The platen heater temperature was 350° F., heater pressure 245 psi, dwell time 30 seconds. The sealed jars were then tested by the procedure of Test No. 3.

The following table shows the results of this test:

TABLE IV

|            | Days to Failure | % of Samples that Failed | % Still Sealed Over 28 Days |
|------------|-----------------|--------------------------|-----------------------------|
| Test No. 3 | N/A             | 0%                       | 100%                        |

As is evident from the data presented in Examples 1–5, treatment of the glass sealing surface with fluorine only or with sulfur oxides only resulted in significantly better seal durability than was obtainable with untreated glass surfaces. A combination treatment using first fluorine and then a metal oxide, as in Examples 2 and 5, produced seals which did not fail under the test conditions.

The improved jar top closure of the present invention has significant advantages over the conventional closures now employed, e.g., the glassine-metal cap closure. Thus, jars containing dry food products sealed according to this invention have a significantly greater shelf life. Since the membrane seal must be broken to remove the contents, the container is tamper evident. The snap-cap and foil plastic seal system is economical and results in considerable savings over conventional sealing systems. Since the sealing membrane is flexible and is in adhesive contact with the container at its rim portion, the container opening may have a large number of shapes. For example, it may be oval, square, have a pour spout, etc.

Elimination of the necessity for screw threads enables the use of containers having more aesthetic designs, which can be employed for other purposes such as vases, etc. after they are emptied. The membrane closure eliminates any torque problems due to the sticking of a screw cap, and avoids rusting and corrosion difficulties.

We claim:

1. In combination, a glass container having a mouth comprising an upper rim with a sealing membrane comprising a thermoplastic material, said glass container rim having been heated to an elevated temperature and treated with a fluorine compound decomposable at said elevated temperature and said membrane being pressed against said rim at a temperature above the softening point but below the melting point of said thermoplastic material.

2. The combination of claim 1 wherein said membrane comprises a thermoplastic film adhesively joined on one face to a thin sheet or foil selected from the group consisting of metal and paper.

3. The combination of claim 2 wherein the rim of the container has been treated with a metal oxide precursor forming a metal oxide at said elevated temperature.

4. The combination of claim 3 wherein the container mouth has been heated to a range of from 800° F. to 1200° F. during said precursor treatment.

5. The combination of claim 3 wherein said metal oxide precursor is a metal organic compound of chromium, tin, or titanium applied to the glass surface in liquid form at a temperature ranging from about 100° F. to 300° F.

6. The combination according to claim 1 wherein the glass container is a soda-lime-silica glass.

* * * * *